United States Patent [19]

Goede et al.

[11] Patent Number: 5,729,414
[45] Date of Patent: Mar. 17, 1998

[54] RECORDING DISK HAVING A NON-MAGNETIZABLE HUB COVER

[75] Inventors: Wolfgang Goede; Martina Effenberg, both of Kehl, Germany

[73] Assignee: EMTEC Magnetics GmbH, Germany

[21] Appl. No.: 915,639

[22] Filed: Jul. 21, 1992

[30] Foreign Application Priority Data

Jul. 23, 1991 [DE] Germany .................. 9109036 U

[51] Int. Cl.$^6$ .......................... G11B 51/82; G11B 23/02
[52] U.S. Cl. ......................................................... 360/133
[58] Field of Search ........................ 360/133, 135, 360/99.05; 369/280, 281, 282, 291, 290

[56] References Cited

U.S. PATENT DOCUMENTS 4,654,733  3/1987  Kawakani et al. ................ 360/133
4,885,653  12/1989  Kato ................................... 360/133
4,920,441  4/1990  Kimura et al. ..................... 360/133
4,941,066  7/1990  Swinburne et al. ................ 360/133
5,014,152  5/1991  Sasaki ................................. 360/133
5,241,441  8/1993  Yamada et al. .................. 360/99.05

FOREIGN PATENT DOCUMENTS

A 240170  10/1987  European Pat. Off. .
60-106027  6/1985  Japan ................................. 360/133

Primary Examiner—Jefferson Evans
Attorney, Agent, or Firm—Keil & Weinkauf

[57] ABSTRACT

A recording disk having an enclosure and a central hub. The hub is made of a magnetizable metal part and a non-magnetizable cover, which substantially completely covers the magnetizable part. The cover prevents recording/reproducing errors which are caused by metal particles of the magnetizable part. The cover may be made of injection molded thermoplastic.

3 Claims, 2 Drawing Sheets

RECORDING DISK HAVING A NON-MAGNETIZABLE HUB COVER

BACKGROUND OF THE INVENTION

1. Field of the Invention

The invention relates to a recording disk having an enclosure, in particular a magnetic disk having a jacket, the enclosure having at least one opening for the entry of a drive member and the at least one opening providing access for a hub which is connected to the recording disk and comprises a magnetizable metal part and at least one non-magnetizable hub part.

2. Description of the Related Art

European Laid-open Application EP-A-240,170 describes a 3.5-inch floppy disk having a hub comprising a metal flange and a plastic ring. The plastic ring is welded on only on one side, so that the other side still has bare metal and consequently there may be still be metal particles present, which can originate from the production of the punched and embossed metal flange.

European Laid-open Application EP-A-133,541 describes a metal reinforcing plate having at least one plastic hub part, it also being possible for the metal reinforcing plate to be provided between two separate plastic hub parts, the hub parts being attached in a sandwich-like manner to the metal reinforcing plate.

SUMMARY OF THE INVENTION

It is an object of the invention to avoid the adverse effect of metal particles on the recording/reproducing quality of the recording disks, at the same time as simple production of the disk hub.

With a recording disk having an enclosure, in particular a magnetic disk having a jacket, in which the enclosure has at least one opening for the entry of a drive member and the at least one opening provides access for a hub which is connected to the recording disk and comprises a magnetizable metal part and at least one non-magnetizable hub part, the object is achieved according to the invention by the non-magnetizable hub part being designed as a substantially complete covering of the metal part in order to prevent recording/reproducing errors on account of metal particles.

In an advantageous design, the covering consists of plastic, in particular of thermoplastic, since this material can be processed in various ways. The covering may expediently also consist of a synthetic resin material, which can be applied for example as a coating or by dipping.

If the covering consists of thermoplastic, a plastic material of the group constituted byacetal, ABS, polyamide, polycarbonate, polyethylene, polypropylene, polystyrene and fluorinated hydrocarbon may expediently be used.

The thickness of the covering may lie for instance in the range of from about 100 to about 600 μm, in particular it may also be about 400 μm.

The metal part of the hub may consist of stainless metal, but it is less expensive to produce it from non-stainless metal.

BRIEF DESCRIPTION OF THE DRAWINGS

Illustrative embodiments of the invention are described below.

One illustrative embodiment is represented in the drawing, in which.

DESCRIPTION OF THE PREFERRED EMBODIMENTS

Figure 1:
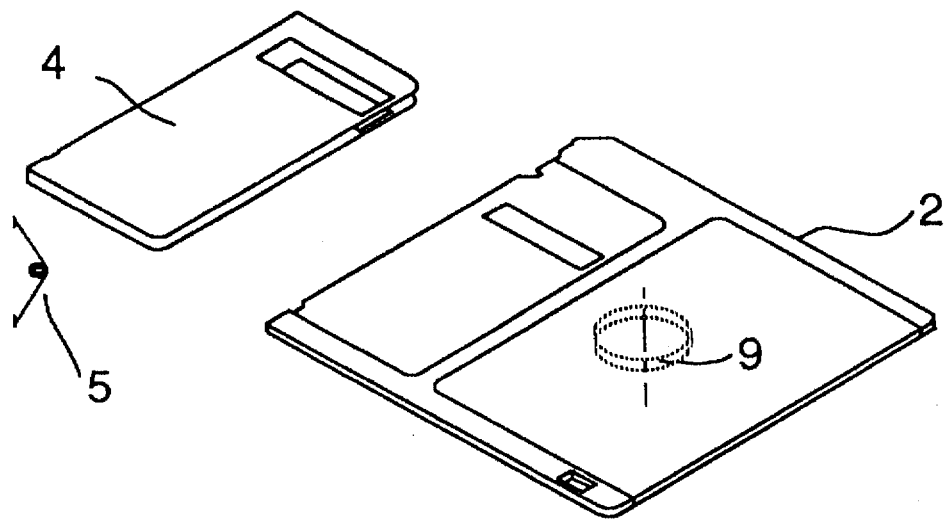
FIG. 1 shows the perspective exploded representation of a 3.5-inch floppy disk.
Figure 1:
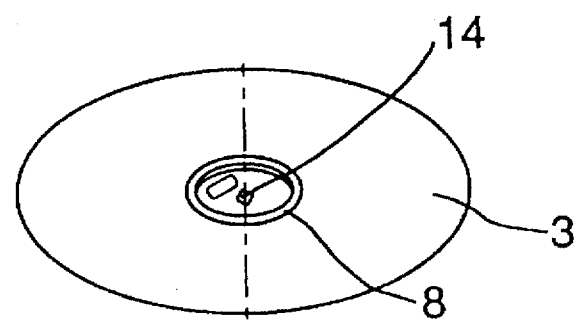
Figure 1:
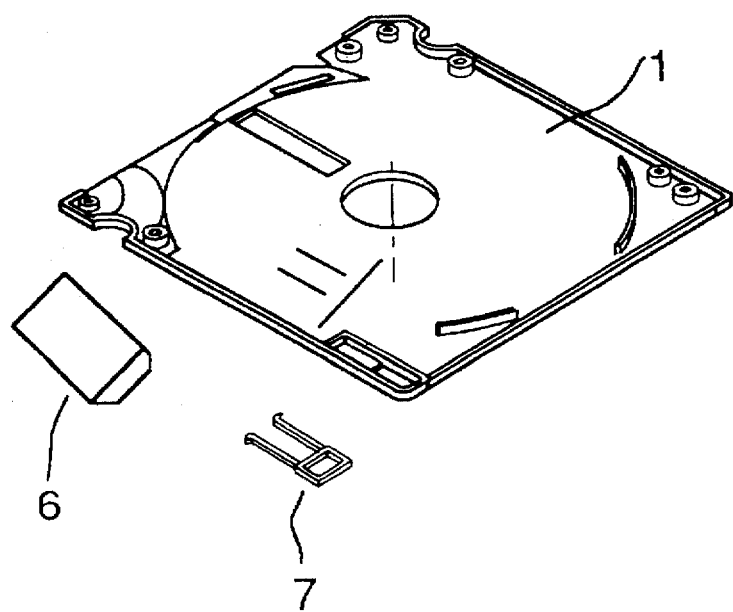

FIG. 1 shows a 3.5-inch floppy disk or micro-floppy disk, which comprises bottom enclosure part 1, top enclosure part 2, the magnetic disk 3, the slide 4 and also the minor parts, slide closure spring 5, pressing leaf spring 6 and write inhibit 7. The magnetic disk 3 has a hub 8, connected centrally to it and having the shape of an inverted flat hat. The hub 8 is usually a part punched out of a magnetizable metal sheet and embossed, to which part small and/or microscopically small metal or other particles are attached owing to the metal production. These particles can easily get onto the surface of the magnetic disk 3 or directly to the recording/reproducing magnetic head and cause recording and reproducing errors as a result.

On the underside of the top enclosure part 2 there is a centering rim 9, shown in broken lines, provided for the hub 8. The central part of the hub 8 fits with its outer periphery in the circular opening of the bottom enclosure part 1 for rotational mounting of the magnetic disk 8 in the enclosure 1, 2.

Figure 2:
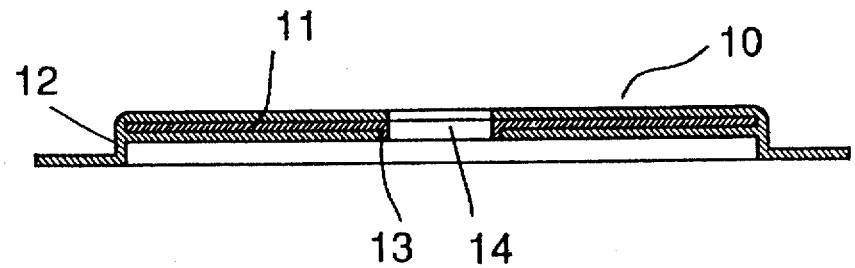
FIG. 2 shows a sectional representation of the hub of the magnetic disk according to line of intersection A—A in FIG. 1, with a punched and embossed hub metal part.

FIG. 2 shows a first configuration according to the invention of the hub, denoted by 10, a metal part 11, punched out and centrally bent over by embossing, being provided with a complete covering 12 of hat-like outer form.

Only the bent-over part 13 of the central opening 14 is not covered on the inside, in order to ensure a defined engagement of the drive spindle (not shown) on the hardware.

Figure 3:
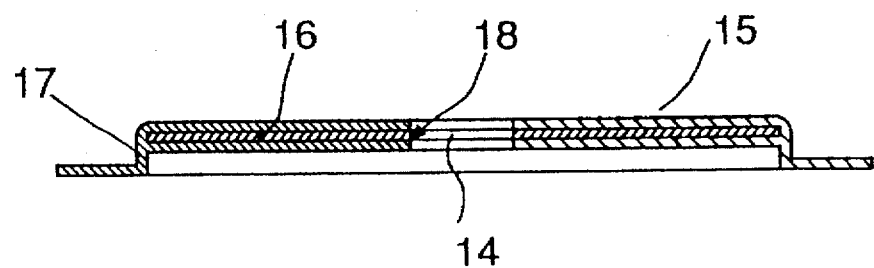
FIG. 3 shows the sectional representation according to FIG. 2, with a flat punched hub metal part.

FIG. 3 shows a further version according to the invention of a hub 15, having an annular, flat, just punched-out metal part 16, which in turn has a virtually complete covering 17. Only the inner edge 18 of the metal part 16 is not covered, but it could quite easily be provided with a masking part of the covering 17.

Figure 4:
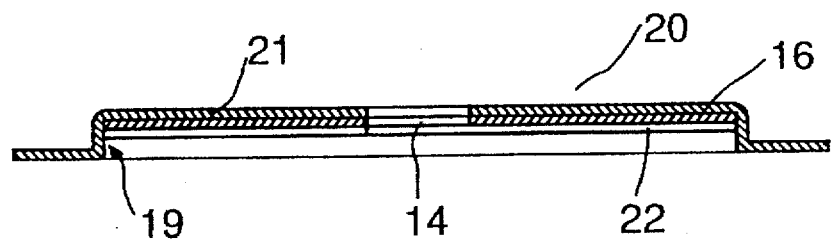
FIG. 4 shows the sectional representation according to FIG. 3, with a flat punched hub metal part and a two-part hub part.

FIG. 4 represents a further configuration, in which a hub 20 is formed with the circular, flat, just punched-out metal part 16, but a two-part virtually complete covering 19. The covering 19 is made up by the outer hat part 21 and the flat inner part 22, which is introduced into the cavity of the hat part 21 after inserting the metal part 16 and is fastened therein by any frictional, clamping or other connecting forces and means.

The metal part 11, 16 may consist of any substance containing magnetizable material. Since the metal parts 11 and 16 are covered substantially completely, non-stainless materials may also be used, which considerably reduces production costs.

The covering may consist of any suitable non-magnetizable material, in particular a plastic. Expedient in this case are thermoplastics or synthetic resins. In particular, plastics of the group constituted by acetal, ABS, polyamide, polycarbonate, polyethylene, polypropylene, polystyrene or fluorinated hydrocarbons are very suitable for a covering 12, 17, 19 according to the invention, since these can be used particularly well for the production of thin layers. The coverings can be mass-produced by spraying, casting, flame spraying, dipping etc. or by coating.

The thickness of the coverings 12, 17, 19 on the upper side of the hat shape should be from about 100 μm to 600 μm, preferably about 400 μm, in order still to be able to ensure magnetic coupling.

By the use of hubs according to the invention, it has been possible to avoid production failures caused by the detaching of minute metal particles of a size of about 1 to 5 μm, which disturb data transmission quite considerably. The covering of the hub is a major contribution to technical product improvement in the case of such recording disks with enclosure, in particular in progressing to ever greater recording densities.

The use of fluorinated hydrocarbons or acetals has the further advantage of torque improvement due to their self-lubricating sliding properties, in particular on the inner and underside of the hub, such as can be achieved for example, with polyoxymethylene (POM) or polytetrafluoroethylene (PTFE).

We claim:

1. A recording disk having an enclosure, the enclosure having at least one opening for the entry of a drive member and the at least one opening providing access to a hub which is connected to the recording disk, said hub comprising a magnetizable metal plate and at least one non-magnetizable thermoplastic cover, wherein the non-magnetizable cover substantially covers the complete surface of the metal plate in order to prevent recording/reproducing errors due to a possible presence of magnetization of metal particles from said magnetizable surface.

2. A recording disk as claimed in claim 1, wherein the thermoplastic cover consists of an injection molded thermoplastic selected from the group consisting of acetal, ABS, polyamide, polycarbonate, polyethylene, polypropylene, polystyrene, and fluorinated hydrocarbon.

3. A recording disk as claimed in claim 1, wherein the cover has a thickness of from about 100 to about 600 μm.

* * * * *